1,591,850

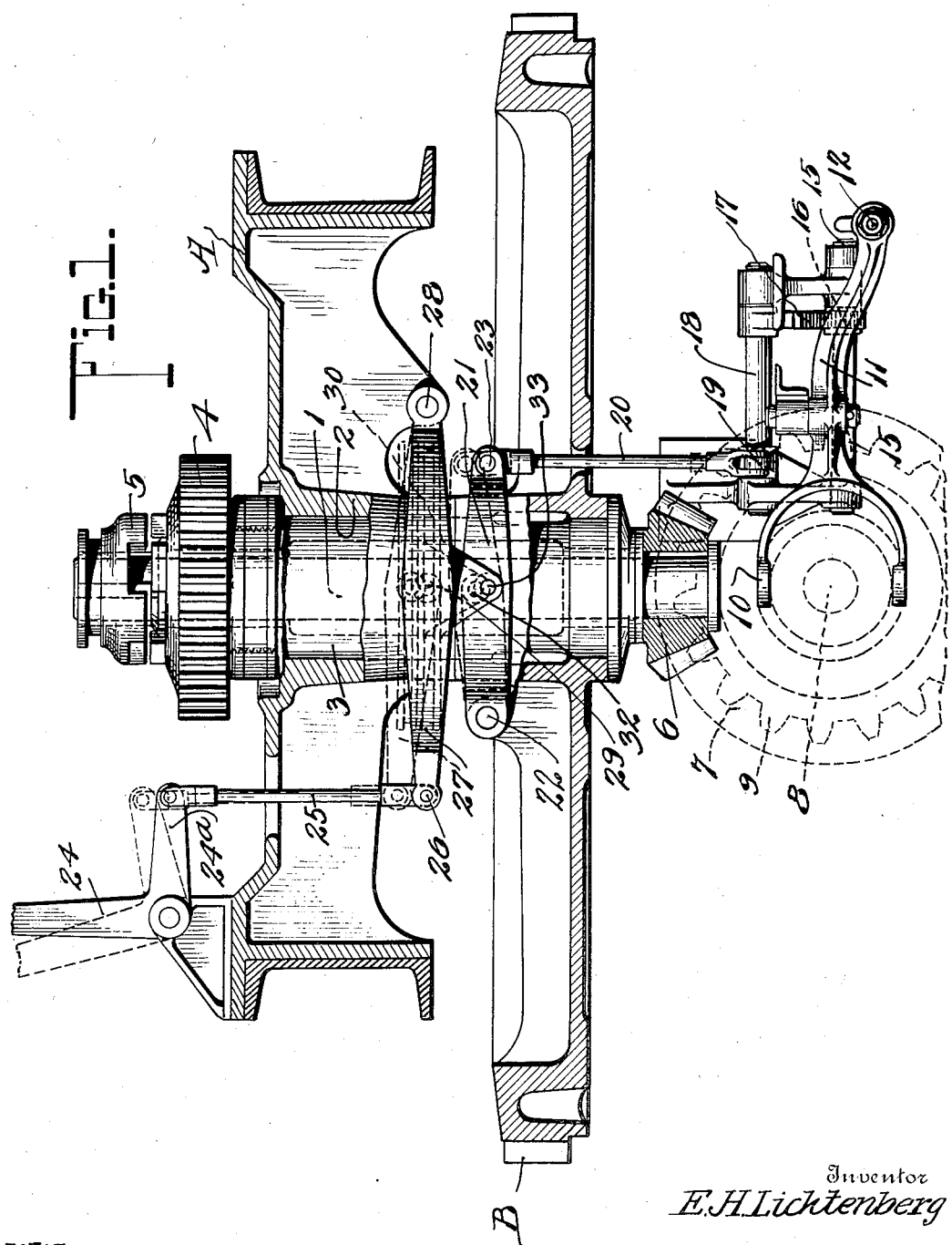
July 6, 1926.
E. H. LICHTENBERG
STEERING CONTROL FOR CRANES
Filed April 18, 1924  2 Sheets-Sheet 1
1,591,850
Inventor
E.H.Lichtenberg
Witness:
E.H.Wagner
By Robt, Robt & Hill
Attorneys July 6, 1926.  
E. H. LICHTENBERG  
STEERING CONTROL FOR CRANES  
Filed April 18, 1924  
1,591,850  
2 Sheets-Sheet 2
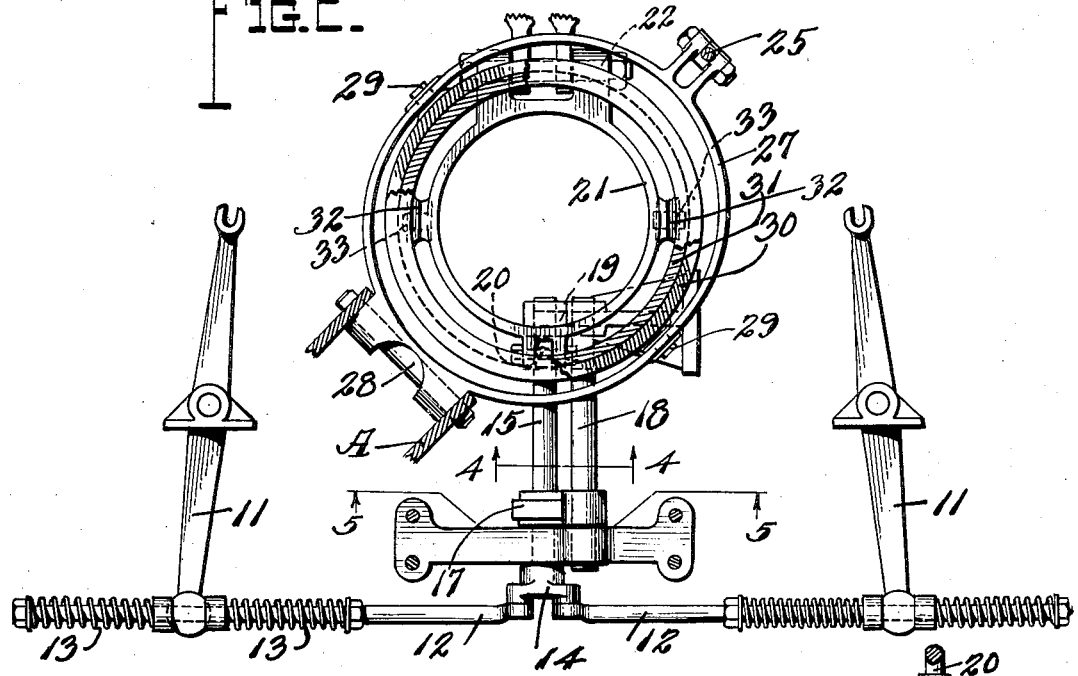
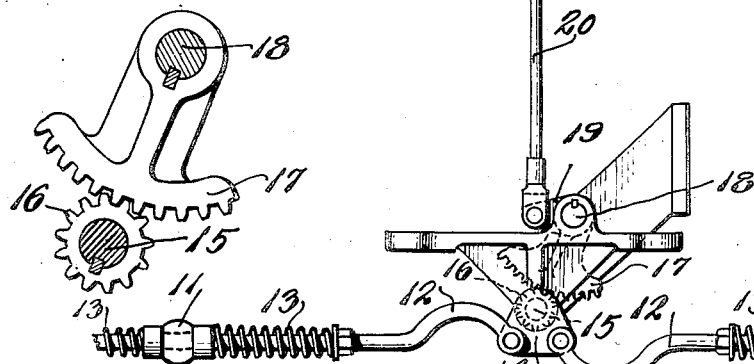
Witness:  
C. H. Wagner
Inventor  
E. H. Lichtenberg  
By Robb Robb & Hill  
Attorneys Patented July 6, 1926.

UNITED STATES PATENT OFFICE.

ERICH H. LICHTENBERG, OF MILWAUKEE, WISCONSIN, ASSIGNOR TO KOEHRING COMPANY, OF MILWAUKEE, WISCONSIN, A CORPORATION.

STEERING CONTROL FOR CRANES.

Application filed April 18, 1924. Serial No. 707,541.

Locomotive cranes of the type embodying endless traction devices for supporting their bases, and equipped with the usual turntable body or car which carries the boom, make desirable the employment of convenient means on the turn-table where the power plant is usually located, whereby to control the steering of a machine through the action of the endless traction devices.

It has been proposed heretofore, as exemplified in the patent of Holt, No. 1,008,338, issued Nov. 14, 1911, to mount upon a caterpillar base, or one embodying opposite endless traction elements, the rotatable platform or car which supports the power plant boom and cable operating drums, the turning of the machine as it moves on the endless traction members being controlled from the rotatable platform or turn-table by manual devices connected to the endless traction members by means coaxial with the center pin of the turn-table. The endless traction devices are caused to be clutched to the driving means operated by the power plant, or unclutched, so that one of them may be driven and the other permitted to idle for turning actions of the machine.

The present invention aims largely to provide an improvement upon steering control mechanism of the general class above referred to, and utilizes, generally speaking, a manual control member on the turntable or car connected by peculiar connections arranged coaxially of the center pin of the turntable with clutch throwing parts which are carried by the traction base of the machine whereby under the influence of the operation of the actuation of the control member on the turntable, by the operator who stands there usually, the clutch throwing devices on the traction base may be controlled properly to cause driving of the traction members at the same speed or to afford different driving effects obtained from said members to secure turning actions of the whole machine when these members do not operate at the same speed.

In the accompanying drawings:—

Fig. 1 illustrates sectionally the upper turntable of a crane, the ring gear mounted on the lower traction base, and the center pin connections between these parts, together with the steering control connections leading from the turntable or car body to the clutch shifting contrivances which are carried by the traction base.

Fig. 2 is a horizontal sectional view taken about on the line 2—2 of Fig. 1, looking downwards.

Fig. 3 is a vertical sectional view showing more particularly the parts illustrated in Fig. 2.

Fig. 4 is a sectional view showing the operating sector by which the pinion on the clutch operating shaft is actuated.

Fig. 5 is a detailed fragmentary sectional view showing more clearly the connection between the sector operating shaft and the vertical operating rod leading thereto.

Since my invention resides primarily in the peculiar connections coaxially related to the center pin connection between the car body of the crane and the traction base, the said connections are primarily illustrated in conjunction only with such parts of the crane or machine on which they are used as are required in order to afford the proper understanding of the invention. The particular clutch shifting mechanism, or that mechanism which controls the driving of the traction members, not illustrated, so that the latter move at the same velocity, or not at the same velocity, is rather immaterial to the invention, though I have illustrated a certain type of such mechanism which has been put into use on Koehring cranes which constitute machines well known in the art.

Referring to the drawings, therefore, and to the parts of the crane in conjunction with which my novel devices are employed, A designates the car body frame which is rotatable in the customary way by gear means thereon cooperating with the ring gear B which is carried by the traction base in the well known manner. The car body or upper turntable means of the crane generally designated at A, but not fully shown, is connected with the traction base by the usual center pin 1 and has the sleeve 2 which surrounds the center pin and also surrounds bearing sleeve means 3 provided intermediate the sleeve 2 and the center pin 1.

It is contemplated that the center pin 1 may be driven by any suitable power plant on the car body or turntable A, as by means of a gear 4 adapted to be clutched to the center pin by the clutch 5. The center pin 1 carries at its lower end a driving pinion 6 adapted to mesh with the bevel gear shown in dotted lines at 7 in Fig. 1, which gear 7 is mounted upon a transverse driving shaft 8 that carries the outer transmitting gears for operating the traction members of the traction base of the crane at the same speeds, or permitting them to operate at other than the same speeds. One of these transmission gears is shown in dotted lines at 9 in Fig. 1 and a clutch yoke 10 is illustrated as engaged with the clutch of said gear for shifting it axially of the shaft 8.

This brings me to the operating connections that I use for controlling the clutch means on the traction base, which clutch means may embody levers 11 having the clutch yokes 10, said levers being best shown in Figs. 1, 2 and 3, though the clutches which are shifted by the same are not illustrated otherwise than in Fig. 1. In other words, I provide the levers 11 engageable preferably with double jaw clutches to engage clutches at opposite sides of each double jaw clutch to render operative gears on which the opposite clutches are carried. Such means is known in the art as one method of communicating to the traction members the same speeds and different speeds alternately, the latter for steering purposes.

The clutch levers 11 are operated each by a rod 12, on which are coiled springs 13 that bear against opposite sides of the end adjacent lever 11 through which the cooperating rod 12 passes. These springs 13 are simply yieldable connections between the parts 11 and 12 to store up power to shift the clutches ultimately, if when their shifting is initiated their teeth are not ready to mesh with the teeth of the coacting clutch members with which they are worked. Each rod 12 is connected to a triangular actuating member 14 carried by a clutch shifting shaft 15 at one end of the latter. Intermediate its ends the shaft 15 carries a pinion 16 that meshes with an actuating sector 17 on a counter shaft 18 adjacent to the shaft 15, the shaft 18 being equipped with an arm 19 connected by a vertical actuating rod 20 to a clutch shifting lever 21. The clutch shifting lever 21 is circular in form and is pivoted at 22 at one end thereof to the ring gear B. At its other end, the lever 21 has connection at 23 to the actuating rod 20. The various shifted positions of the clutch members operated by the levers 11 are obtained by movement of the circular shifting lever 21 and the latter surrounds the center pin axis 1 of the crane. I use peculiar connections between the levers 21 and the control lever 24 on the body or platform A of the machine to transmit movement or adjustments of the lever 24 to the lever 21 and the corresponding clutch parts operated thereby.

A vertical connecting rod 25 leads downwards from an off-standing arm 24ª of the control lever 24, and is attached at its lower end at 26 to an upper circular lever 27 which is pivoted at the opposite end at 28 to the frame or car body A. The lever 27 is provided with openings at opposite ends thereof which receive pivot lugs 29 projecting outwards from a swivel ring 30, which is seated in an external annular groove of a shifting ring 31. The shifting ring 31 establishes a rotative connection between the lever 27 and the shifting ring 31. The shifting ring 31 is equipped with downwardly projecting arms 32 which have lugs or pins 33 connecting them with opposite sides of the lower circular lever 21.

Thus it is that no matter what the position may be of the upper platform or car body A of the crane, motion may be transmitted to the rod 25, lever 27, swivel ring 30, shifting ring 31, and lever 21, to the rod 20 and to the shafts 15 and 18 with which the rod 20 is connected directly or indirectly.

The lever 24 may be adjusted at will to any one of a number of positions, four ordinarily as for high speed, low speed, right turn, and left turn positions. It may be moved to such positions and locked and if the clutches do not go in at once as of the new shift, the springs 13 will yield as required to effect the action later when the teeth or jaws of the clutches arrive in meshing positions.

Movement of the lever 24 rocks this lever on its pivot and raises or lowers the swiveled ring 30, and likewise the shifting ring 31. This actuation takes place irrespective of the relative positions of the crane part A and its traction base because the parts 27, 30, 31 and 21 surround the axis of the car or turntable A. The lever 21 being connected with the ring 31 will be rocked, and thus motion to shift the clutch levers 11 may be transmitted any time to the latter whatever the position of the crane body A may be.

Having thus described my invention, what I claim as new and desire to secure by Letters Patent, is:

1. A steering connection unit for rotary crane type machines comprising a structure adapted to surround the center pin axis of a crane and made up of the following main parts: a lever member, an upper circular lever, a swivel ring pivoted thereto, a shifting ring with which the swivel ring has rotative connection, a lower circular lever, and speed control devices operatively connected with said lever, together with pivotal connections between said lower circular lever and said shifting ring.

2. In steering control means for cranes, in combination, traction base means, a rotary car body mounted thereon, a center pin connection between the two, a steering control device on the rotary car body, traction speed control devices mounted on the traction base means, and operative connections between said steering control device and traction speed control devices, comprising a lever pivoted to the rotary car body, a lever pivoted to the traction base means, and means connecting the two levers together, including an external grooved shifting ring having pivotal connection with the lever on the traction base means, and a ring swiveled on said shifting ring in the grooved portion thereof and having pivotal connection with the lever on the rotative car body.

3. In steering control means for cranes, in combination, traction base means, a rotary car body mounted thereon, a center pin connection between the two, a steering control device on the rotary car body, traction speed control devices mounted on the traction base means, and operative connections between said steering control device and traction speed control devices, comprising a lever pivoted to the rotary car body, a lever pivoted to the traction base means, the said levers comprising circular members surrounding the center pin axis above mentioned, a shifting ring intermediate said levers and having pivotal connection with one of them, and a swiveled ring carried by said shifting ring to rotate relatively thereto and having pivotal connection with the other of the levers.

In testimony whereof I affix my signature.

ERICH H. LICHTENBERG.